United States Patent

Draber et al.

[11] 3,910,909
[45] Oct. 7, 1975

[54] PROCESS FOR THE PREPARATION OF 1,2,4-TRIAZIN-5-ONE COMPOUNDS

[75] Inventors: Wilfried Draber, Wuppertal-Elberfeld; Karlfried Dickore, Leverkusen; Helmut Timmler, Wuppertal-Vohwinkel, all of Germany

[73] Assignee: Bayer Aktiengesellschaft, Leverkusen, Germany

[22] Filed: July 18, 1972

[21] Appl. No.: 272,921

[30] Foreign Application Priority Data
July 29, 1971 Germany............................ 2138031

[52] U.S. Cl......... 260/248 AS; 71/93; 260/465.5 R; 260/247.5 C
[51] Int. Cl.[2]........................................ C07D 253/06
[58] Field of Search............... 260/248 AS, 247.5 C

[56] References Cited
UNITED STATES PATENTS
3,671,523 6/1972 Westphal et al..................... 260/248
3,847,914 11/1974 Dickore et al...................... 260/248

*Primary Examiner*—John M. Ford
*Attorney, Agent, or Firm*—Burgess, Dinklage & Sprung

[57] ABSTRACT

1,2,4-triazin-5-one compounds of the formula:

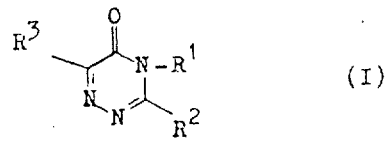

wherein the R radicals can be generally hydrogen or organic substituents, are prepared by reacting a diazabutadiene of the formula:

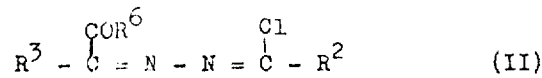

wherein $R^2$ and $R^3$ are hydrogen or organic substituents and $R^6$ is chlorine or alkoxy, with a compound of the formula:

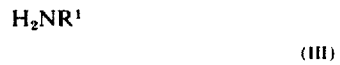

in which $R^1$ is hydrogen, an organic, or an inorganic substituent, at a temperature between 0°C and 150°C in the presence of an acid-binding agent and optionally in the present presence of a diluent. The compounds produced have herbicidal activity.

15 Claims, No Drawings

PROCESS FOR THE PREPARATION OF 1,2,4-TRIAZIN-5-ONE COMPOUNDS

The present invention relates to a novel process for the preparation of certain 1,2,4-triazin-5-one compounds. In addition, this invention relates to certain new 1,2,4-triazin-5-one compounds and, in further aspect, to herbicidal compositions containing 1,2,4-triazin-5-one compounds.

It is known that monohydrazones of α-diketones can be reacted with formamide to give 5,6-disubstituted 1,2,4-triazines (see Chem. Ber 87, 1540–1543 (1954)). This process (a), however, yields no 3-alkyl-4-amino derivatives and is moreover restricted to aromatic α-diketones.

Also known is the cyclization of C-amino-C'-cyano-p-nitrobenzaldazines, 1,2,4-triazin-5-ones being formed which are substituted in 3- and 6-positions by the p-nitrophenyl radical (see Chem. Ber. 101, 2351–2359 (1968)). However, it is not possible to prepare 3-alkyl-4-amino derivatives according to this process (b). Moreover, the said process does not allow the introduction of any desired alkyl or aryl radicals into the 3- and 5-positions.

ated hetero-atom(nitrogen, sulphur or oxygen) and in the 6-position a phenyl ring. Thus, this process (c) is not suitable for the preparation of 3-unsubstituted or 3-alkyl-, 3-alkenyl-, 3-cycloalkyl- or 3-aryl-substituted 1,2,4-triazin-5-ones.

(c)

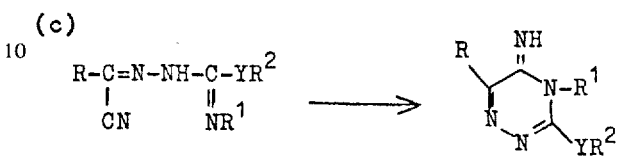

A further process (d), namely the reaction of 1-cyano-4-chloro-2,3-diazabutadienes with ammonia to give 1,2,4-triazin-5-imines and hydrolysis with 48%-strength hydrobromic acid, yields 3,6-disubstituted 1,2,4-triazin-5-ones, provided that the two substituents are alike. Otherwise, a mixture of two different 1,2,4-triazin-5-ones is formed which can not, or only with poor yield, be separated. A reaction with amines instead of ammonia leads (see Ann. Chimica (Rome) 50, (a)

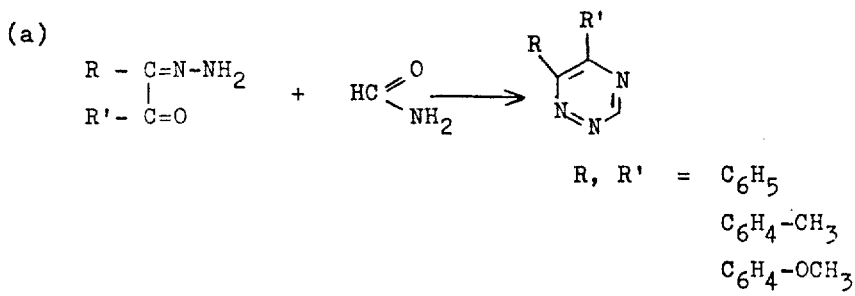

(b)

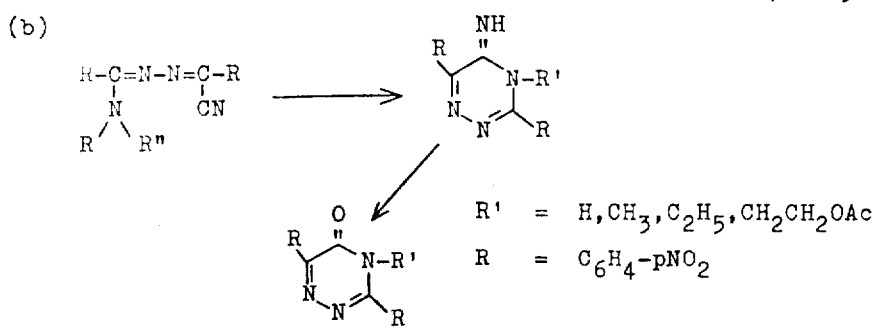

It is also known that hydrazone derivatives of benzoyl cyanides are rendered capable of cyclization by the addition of alkali metal (see Belgian Pat. No. 735,318 and German Democratic Republic (East German) Pat. No. 75,855). This process, however, yields only the imines of triazin-5-ones which bear in the 3-position an alkyl- 277–287 (1960)) to 5-membered heterocycles, namely the 1,2,4-triazoles. A reaction with hydrazine leads to 1-cyano-4-hydrazono-2,3-diazabutadienes, which cyclize to give 1,2,4,5-tetrazines. A further disadvantage of this process (d) is that the starting materials, 3,5-disubstituted 4-nitrosopyrazoles, are difficult to obtain.

(d)

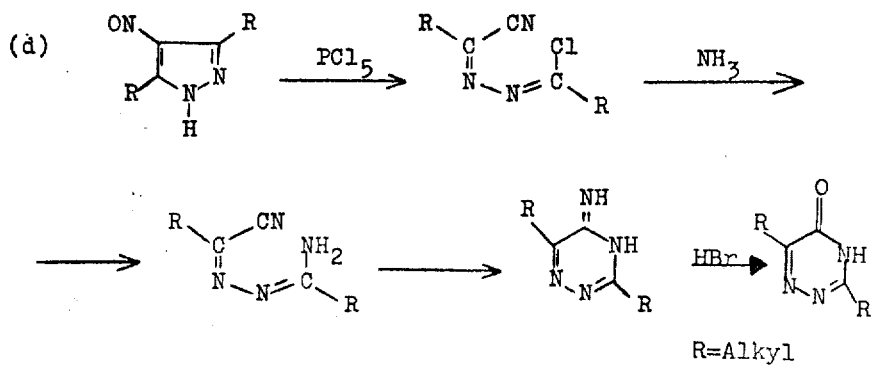

R=Alkyl

The present invention provides a process for the preparation of a 1,2,4-triazin-5-one of the general formula

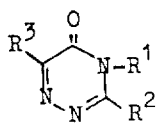 (I)

in which
R$^1$ is hydrogen, optionally substituted alkyl, alkenyl, alkynyl, cycloalkyl, hydroxy, alkoxy, aryl, optionally substituted aralkyl or the group

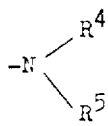

R$^4$ is hydrogen or alkyl of from 1 to 4 carbon atoms, and

R$^5$ is hydrogen, alkyl, haloalkyl, phenyl, alkylphenyl, alkoxyphenyl, alkylmercaptophenyl or optionally substituted phenylalkyl, or R$^4$ and R$^5$, together with the nitrogen atom to which they are shown attached, form a 5- or 6-membered heterocyclic ring, R$^2$ is hydrogen, optionally substituted alkyl, alkenyl, cycloalkyl, optionally substituted aryl, optionally substituted aralkyl or a C-bonded heterocyclic radical, and R$^3$ is optionally substituted alkyl, alkenyl, cycloalkyl, optionally substituted aryl or optionally substituted aralkyl.

The process of the invention comprises reacting a diazabutadiene of the general formula

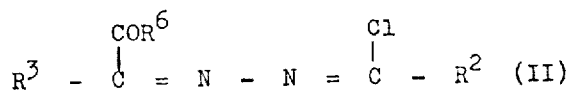 (II)

in which
R$^2$ and R$^3$ have the meanings stated above, and
R$^6$ is chlorine or alkoxy;
with a compound of the formula

 (III)

in which
R$^1$ has the meaning stated above,
at a temperature between 0°C and 150°C in the presence of an acid-binding agent and optionally in the presence of a diluent.

Preferably, in the above formulas, R$^1$ is hydrogen, hydroxyl, straight-chain or branched alkyl with up to 6 carbon atoms (which may be substituted by hydroxyl or alkoxy of from 1 to 4 carbon atoms), straight-chain or branched alkenyl or alkynyl with in either case up to 6 carbon atoms, cycloalkyl with 3 to 6 carbon atoms, straight-chain or branched alkoxy with 1 to 4 carbon atoms, aralkyl of from 1 to 2 carbon atoms in the alkyl moiety and 6 to 10 carbon atoms in the aryl moiety (which aralkyl may be substituted by an alkyl, alkoxy or alkylthio radical of from 1 to 4 carbon atoms) or the group $-N\begin{matrix}R^4\\R^5\end{matrix}$ in which R$^4$ is hydrogen, methyl, ethyl, propyl, isopropyl, butyl, sec.-butyl or tert.-butyl and R$^5$ is hydrogen, straight-chain or branched alkyl of from 1 to 4 carbon atoms, haloalkyl of from 1 to 4 carbon atoms and 1 to 3 halogen atoms or a phenyl or phenylalkyl radical (which radical may be substituted by an alkyl, alkoxy or alkylthio group of from 1 to 4 carbon atoms) or R$^4$ and R$^5$, together with the nitrogen atom to which they are shown attached, form a pyrrolidyl, piperidyl or morpholino radical; R$^2$ is hydrogen, straight-chain or branched alkyl of from 1 to 6 carbon atoms (which may be substituted by hydroxyl, cyano or an alkoxy or alkylthio group of from 1 to 4 carbon atoms), straight-chain or branched alkenyl of from 2 to 6 carbon atoms, cycloalkyl of from 3 to 6 carbon atoms, aralkyl of from 1 to 2 carbon atoms in the alkyl moiety and 6 to 10 carbon atoms in the aryl moiety (which aralkyl may be substituted by hydroxyl, an alkyl, alkoxy or haloalkyl radical of from 1 to 4 carbon atoms or halogen, especially fluorine, chlorine or bromine) or aryl of from 6 to 10 carbon atoms (which may be substituted by halogen, alkyl, alkoxy, hydroxyl or trifluoromethyl); R$^3$ is unsubstituted straight-chain or branched alkyl of from 1 to 12 carbon atoms, alkyl of from 1 to 6 carbon atoms substituted by an alkoxy or alkylthio group of from 1 to 4 carbon atoms, by aryloxy of from 6 to 10 carbon atoms (especially phenyloxy) or by alkoxycarbonyl of from 1 to 3 carbon of from 1 to 3 carbon atoms in the alkyl moiety, straight-chain or branched alkenyl of from 2 to 12 carbon atoms, cycloalkyl of from 3 to 10 carbon atoms, aryl of from 6 to 10 carbon atoms or aralkyl of from 1 to 3 carbon atoms in the alkyl moiety and 6 to 10 carbon atoms in the aryl moiety [the two last-mentioned radicals R$^3$ optionally carrying on the aryl radical one or more substituents, preferably selected from straight-chain or branched alkyl of from 1 to 4 carbon atoms, alkoxy of from 1 to 4 carbon atoms, alkylthio of from 1 to 4 carbon atoms, halogen, especially fluorine, chlorine or bromine, dialkylamino of from 2 to 6 carbon atoms in each alkyl radical (the two alkyls being alike or different), cyano or thiocyano]; and R$^6$ is chlorine or alkoxy of from 1 to 4 carbon atoms.

The present invention also provides, as new compounds, the 1,2,4-triazin-5-ones of the general formula

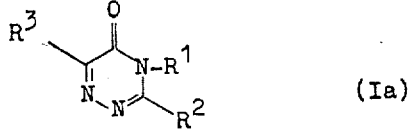 (Ia)

in which
R$^1$ is hydrogen, optionally substituted alkyl, alkenyl, alkynyl, cycloalkyl, hydroxyl, alkoxy, aryl or optionally substituted aralkyl, R$^2$ is hydrogen, optionally substituted alkyl, alkenyl, cycloalkyl, optionally substituted aryl, optionally substituted aralkyl or a C-bonded heterocyclic ring, and R$^3$ is optionally substituted alkyl, alkenyl, cycloalkyl optionally substituted aryl or optionally substituted aralkyl.

It is decidedly surprising that 1,2,4-triazin-5-ones of the formula (I) are obtained by the process according to the present invention since according to the prior art it would have been expected that 1,2,4-triazoles or open-chain compounds would be formed.

The process according to the invention exhibits a number of advantages. Thus, the compounds of the formula (I) are obtainable in very good purity and in good yields. A further advantage of the process according to the invention is that substituents in 3- and 6-positions of the triazine ring can be widely varied.

If 1-tert.-butyl-1-methoxycarbonyl-4-chloro-4-ethyl-2,3-diazabutadiene and methylamine are used as starting materials, the reaction course can be represented by the following equation:

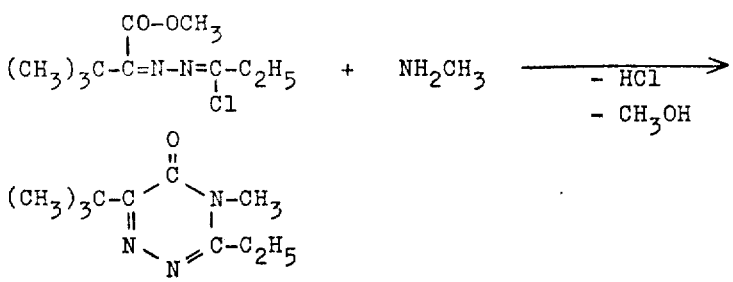

As examples of the diazabutadienes that can be used according to the invention, there may be mentioned:
1-tert.-butyl-1-methoxycarbonyl-4-chloro-4-ethyl-2,3-diazabutadiene
1-tert.-butyl-1-methoxycarbonyl-4-chloro-4-cyclopropyl-2,3-diazabutadiene
1-tert.-butyl-1-methoxycarbonyl-4-chloro-4-tertiarybutyl-2,3-diazabutadiene
1-tert.-butyl-1-methoxycarbonyl-4-chloro-4-cyclopentyl-2,3-diazabutadiene
1-tert.-butyl-1-methoxycarbonyl-4-chloro-4-cyanomethyl-2,3-diazabutadiene
1-phenyl-1-methoxycarbonyl-4-chloro-4-ethyl-2,3-diazabutadiene
1-phenyl-1-ethoxycarbonyl-4-chloro-4-ethyl-2,3-diazabutadiene
1-(4'-methoxyphenyl)-1-ethoxycarbonyl-4-chloro-4-methyl-2,3-diazabutadiene
1-(4'-methylphenyl)-1-ethoxycarbonyl-4-chloro-4-ethyl-2,3-diazabutadiene
1-(4'-methylphenyl)-1-ethoxycarbonyl-4-chloro-4-methyl-2,3-diazabutadiene
1-(4'-chlorophenyl)-1-ethoxycarbonyl-4-chloro-4-cyclohexyl-2,3-diazabutadiene
1-(4'-chlorophenyl)-1-ethoxycarbonyl-4-chloro-4-methyl-2,3-diazabutadiene
1-(4'-chlorophenyl)-1-ethoxycarbonyl-4-chloro-4-ethyl-2,3-diazabutadiene
1-(4'-chlorophenyl)-1-ethoxycarbonyl-4-chloro-4-propyl-2,3-diazabutadiene
1-(4'-chlorophenyl)-1-ethoxycarbonyl-4-chloro-4-tertiarybutyl-2,3-diazabutadiene
1-phenyl-1-ethoxycarbonyl-4-chloro-4-methyl-2,3-diazabutadiene
1-phenyl-1-ethoxycarbonyl-4-chloro-4-propyl-2,3-diazabutadiene
1-phenyl-1-ethoxycarbonyl-4-chloro-4-isopropyl-2,3-diazabutadiene
1-phenyl-1-ethoxycarbonyl-4-chloro-4-tert.-butyl-2,3-diazabutadiene
1-phenyl-1-ethoxycarbonyl-4-chloro-4-sec.-butyl-2,3-diazabutadiene
1-tert.-butyl-1-chlorocarbonyl-4-chloro-4-ethyl-2,3-diazabutadiene.

The diazabutadienes of the formula (II) used as starting materials have not hiterto been described in the literature but can be prepared by reacting glyoxylic acid ester 2-acylhydrazones of the general formula

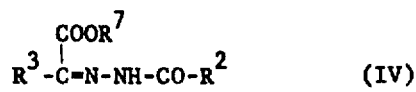

in which
R$^2$ and R$^3$ have the meanings stated above, and
R$^7$ is hydrogen or alkyl of from 1 to 4 carbon atoms, with chlorinating agents, such as phosphorus pentachloride, thionyl chloride or phosgene, at temperatures between 0°C and 100°C and optionally in the presence of a solvent (see the Preparative Examples hereinbelow).

Glyoxylic acid ester 2-acylhydrazones of the formula (IV) have not hitherto been described in the literature; they can be prepared by reacting glyoxylic acid esters of the general formula

in which
R$^3$ and R$^7$ have the meanings stated above
with an acylhydrazine of the general formula

in which
R$^2$ has the meaning stated above in the presence of an organic solvent, for example an alcohol such as methanol or ethanol, and an acid catalyst, in general at temperatures between 50°C and 130°C (see the Preparative Examples hereinbelow).

The compounds of the formula (III) also used as starting materials (amines, ammonia, hydroxylamine and hydrazines) are known.

As diluents for use in the process according to the invention all polar organic solvents are suitable, especially alcohols such as methanol, ethanol or isopropanol; ethers such as tetrahydrofuran or dioxane; nitriles such as tolunitrile or acetonitrile; acid amides such as dimethyl formamide; and sulfoxides such as dimethyl sulfoxide.

The reaction according to the invention is carried out in the presence of an acid-binding agent, preferably an alkali metal carbonate, such as sodium carbonate; an alkaline earth metal carbonate, such as barium carbonate; hydroxylamine, ammonia, or an organic base such as a primary amine or a substituted hydrazine. Thus, it will be understood that an excess of the compound of the formula (III) may possibly be used as the acid-binding agent.

The reaction temperatures can be varied within a fairly wide range. In general, the work is carried out at temperatures between 0°C and 150°C, preferably between 50°C and 120°C.

When carrying out the process according to the invention, for 1 mole of diazabutadiene of the formula (II) there are used, in general, 1 mole of the compound of the formula (III) and 1 mole of acid-binder; however, as mentioned above, it is also possible to use, instead of the acid-binder, an excess, in general 2 to 5 moles, of the amine (III). Exceeding, or going below, these amounts, however, brings no substantial improvement of yield.

The reaction according to the invention is, in general, carried out at normal pressure, although it can also be effected at increased pressure.

To isolate the 1,2,4-triazin-5-ones of the formula (I), the solvent is distilled off in a vacuum, the residue is taken up with water and the residue insoluble therein is filtered off. The further purification of the solid substance obtained is effected by recrystallization. In many cases, the distilling off of the solvent can be dispensed with. The reaction mixture is simply diluted with water and suction filtration from the precipitated triazinone is effected.

Illustrative of the compounds that can be prepared according to the invention, are for example:

3,4,6-trimethyl-1,2,4-triazin-5-one,
3-ethyl-4,6-dimethyl-1,2,4-triazin-5-one,
3-ethyl-4-hydroxy-6-methyl-1,2,4-triazin-5-one,
3-ethyl-4-methoxy-6-methyl-1,2,4-triazin-5-one,
3-ethyl-4-isopropoxy-6-methyl-1,2,4-triazin-5-one,
3-ethyl-4-benzyloxy-6-methyl-1,2,4-triazin-5-one,
3-ethyl-4-hydroxy-6-isopropyl-1,2,4-triazin-5-one,
3-ethyl-4-methoxy-6-isopropyl-1,2,4-triazin-5-one,
3-ethyl-4-ethoxy-6-isopropyl-1,2,4-triazin-5-one,
3-ethyl-4-isopropoxy-6-isopropyl-1,2,4-triazin-5-one,
3-ethyl-4-benzyloxy-6-isopropyl-1,2,4-triazin-5-one,
3-ethyl-4-methyl-6-isopropyl-1,2,4-triazin-5-one,
3-ethyl-4-ethyl-6-isopropyl-1,2,4-triazin-5-one,
3-ethyl-4-isopropyl-6-isopropyl-1,2,4-triazin-5-one,
3-ethyl-4-tert.-butyl-6-isopropyl-1,2,4-triazin-5-one,
3-ethyl-4-allyl-6-isopropyl-1,2,4-triazin-5-one,
3-ethyl-4-propargyl-6-isopropyl-1,2,4-triazin-5-one,
3-ethyl-4-benzyl-6-isopropyl-1,2,4-triazin-5-one,
3-ethyl-4-cyclopropyl-6-isopropyl-1,2,4-triazin-5-one,
3-ethyl-4-cyclopentyl-6-isopropyl-1,2,4-triazin-5-one,
3-ethyl-4-phenyl-6-isopropyl-1,2,4-triazin-5-one,
3-ethyl-4-p-chlorophenyl-6-isopropyl-1,2,4-triazin-5-one,
3-ethyl-4-naphthyl-6-isopropyl-1,2,4-triazin-5-one,
3-ethyl-4-hydroxy-6-n-propyl-1,2,4-triazin-5-one,
3-ethyl-4-methyl-6-n-propyl-1,2,4-triazin-5-one,
3-ethyl-4-ethyl-6-n-propyl-1,2,4-triazin-5-one,
3-ethyl-4-hydroxy-6-cyclopentyl-1,2,4-triazin-5-one,
3-ethyl-4-methyl-6-cyclopentyl-1,2,4-triazin-5-one,
3-ethyl-4-methoxy-6-cyclopentyl-1,2,4-triazin-5-one,
3-ethyl-4-hydroxy-6-cyclohexyl-1,2,4-triazin-5-one,
3-ethyl-4-methyl-6-cyclohexyl-1,2,4-triazin-5-one,
3-ethyl-4-methoxy-6-cyclohexyl-1,2,4-triazin-5-one,
3-ethyl-4-isopropoxy-6-cyclohexyl-1,2,4-triazin-5-one,
3-ethyl-4-hydroxy-6-isobutyl-1,2,4-triazin-5-one,
3-ethyl-4-methoxy-6-isobutyl-1,2,4-triazin-5-one,
3-ethyl-4-ethoxy-6-isobutyl-1,2,4-triazin-5-one,
3-ethyl-4-methyl-6-isobutyl-1,2,4-triazin-5-one,
3-ethyl-4-allyl-6-isobutyl-1,2,4-triazin-5-one,
3-ethyl-4-propargyl-6-isobutyl-1,2,4-triazin-5-one,
3-ethyl-4-benzyl-6-isobutyl-1,2,4-triazin-5-one,
3-ethyl-4-tert.-butyl-6-isobutyl-1,2,4-triazin-5-one,
3-ethyl-4-phenyl-6-isobutyl-1,2,4-triazin-5-one,
3-ethyl-4-amino-6-isobutyl-1,2,4-triazin-5-one,
3-ethyl-4-methoxy-6-tert.-butyl-1,2,4-triazin-5-one,
3-ethyl-4-ethoxy-6-tert.-butyl-1,2,4-triazin-5-one,
3-ethyl-4-dimethylamino-6-tert.-butyl-1,2,4-triazin-5-one,
3-ethyl-4-piperidino-6-tert.-butyl-1,2,4-triazin-5-one,
3-ethyl-4-morpholino-6-tert.-butyl-1,2,4-triazin-5-one,
3-ethyl-4-ethyl-6-tert.-butyl-1,2,4-triazin-5-one,
3-ethyl-4-isopropyl-6-tert.-butyl-1,2,4-triazin-5-one,
3-ethyl-4-benzyl-6-tert.-butyl-1,2,4-triazin-5-one,
3-ethyl-4,6-di-tert.-butyl-1,2,4-triazin-5-one,
3-ethyl-4-cyclohexyl-6-tert.-butyl-1,2,4-triazin-5-one,
3-isopropyl-4,6-dimethyl-1,2,4-triazin-5-one,
3-isopropyl-4-hydroxy-6-methyl-1,2,4-triazin-5-one,
3-isopropyl-4-methoxy-6-methyl-1,2,4-triazin-5-one,
3-isopropyl-4-isopropoxy-6-methyl-1,2,4-triazin-5-one,
3-isopropyl-4-benzyloxy-6-methyl-1,2,4-triazin-5-one,
3-isopropyl-4-hydroxy-6-isopropyl-1,2,4-triazin-5-one,
3-isopropyl-4-methoxy-6-isopropyl-1,2,4-triazin-5-one,
3-isopropyl-4-ethoxy-6-isopropyl-1,2,4-triazin-5-one,
3-isopropyl-4-isopropoxy-6-isopropyl-1,2,4-triazin-5-one,
3-isopropyl-4-benzyloxy-6-isopropyl-1,2,4-triazin-5-one,
3-isopropyl-4-methyl-6-isopropyl-1,2,4-triazin-5-one,
3-isopropyl-4-ethyl-6-isopropyl-1,2,4-triazin-5-one,
3-isopropyl-4-isopropyl-6-isopropyl-1,2,4-triazin-5-one,
3-isopropyl-4-tert.-butyl-6-isopropyl-1,2,4-triazin-5-one,
3-isopropyl-4-allyl-6-isopropyl-1,2,4-triazin-5-one,
3-isopropyl-4-propargyl-6-isopropyl-1,2,4-triazin-5-one,
3-isopropyl-4-benzyl-6-isopropyl-1,2,4-triazin-5-one,
3-isopropyl-4-cyclopropyl-6-isopropyl-1,2,4-triazin-5-one,
3-isopropyl-4-cyclopentyl-6-isopropyl-1,2,4-triazin-5-one,
3-isopropyl-4-cyclohexyl-6-isopropyl-1,2,4-triazin-5-one,
3-isopropyl-4-phenyl-6-isopropyl-1,2,4-triazin-5-one,
3-isopropyl-4-p-chlorophenyl-6-isopropyl-1,2,4-triazin-5-one, 3-isopropyl-4-naphthyl-6-isopropyl-1,2,4-triazin-5-one,
3-isopropyl-4-hydroxy-6-n-propyl-1,2,4-triazin-5-one,
3-isopropyl-4-methyl-6-n-propyl-1,2,4-triazin-5-one,
3-isopropyl-4-ethyl-6-n-propyl-1,2,4-triazin-5-one,
3-isopropyl-4-hydroxy-6-cyclopentyl-1,2,4-triazin-5-one,
3-isopropyl-4-methyl-6-cyclopentyl-1,2,4-triazin-5-one,
3-isopropyl-4-methoxy-6-cyclopentyl-1,2,4-triazin-5-one,
3-isopropyl-4-hydroxy-6-cyclohexyl-1,2,4-triazin-5-one,
3-isopropyl-4-methyl-6-cyclohexyl-1,2,4-triazin-5-one,
3-isopropyl-4-methoxy-6-cyclohexyl-1,2,4-triazin-5-one,
3-isopropyl-4-isopropoxy-6-cyclohexyl-1,2,4-triazin-5-one,
3-isopropyl-4-hydroxy-6-isobutyl-1,2,4-triazin-5-one,
3-isopropyl-4-methoxy-6-isobutyl-1,2,4-triazin-5-one,
3-isopropyl-4-ethoxy-6-isobutyl-1,2,4-triazin-5-one,
3-isopropyl-4-methyl-6-isobutyl-1,2,4-triazin-5-one,
3-isopropyl-4-allyl-6-isobutyl-1,2,4-triazin-5-one,
3-isopropyl-4-propargyl-6-isobutyl-1,2,4-triazin-5-one,
3-isopropyl-4-benzyl-6-isobutyl-1,2,4-triazin-5-one,
3-isopropyl-4-tert.-butyl-6-isobutyl-1,2,4-triazin-5-one,
3-isopropyl-4-phenyl-6-isobutyl-1,2,4-triazin-5-one,
3-isopropyl-4-amino-6-isobutyl-1,2,4-triazin-5-one,
3-isopropyl-4-methoxy-6-tert.-butyl-1,2,4-triazin-5-one,
3-isopropyl-4-ethoxy-6-tert.-butyl-1,2,4-triazin-5-one,
3-isopropyl-4-dimethylamino-6-tert.-butyl-1,2,4-triazin-5-one,
3-isopropyl-4-piperidino-6-tert.-butyl-1,2,4-triazin-5-one,
3-isopropyl-4-morpholino-6-tert.-butyl-1,2,4-triazin-5-one,
3-isopropyl-4-ethyl-6-tert.-butyl-1,2,4-triazin-5-one,
3-isopropyl-4-isopropyl-6-tert.-butyl-1,2,4-triazin-5-one,
3-isopropyl-4-benzyl-6-tert.-butyl-1,2,4-triazin-5-one,
3-isopropyl-4-tert.-butyl-6-tert.-butyl-1,2,4-triazin-5-one, 3-isorpropyl-4-cyclohexyl-6-tert.-butyl-1,2,4-triazin-5-one,
3-ethyl-4-methoxy-6-phenyl-1,2,4-triazin-5-one,
3-isopropyl-4-hydroxy-6-phenyl-1,2,4-triazin-5-one.
The process of this invention is illustrated in and by the following preparative Examples.

EXAMPLE 1

Preparation of
3-ethyl-4-amino-6-tert.-butyl-1,2,4-triazin-5-one.

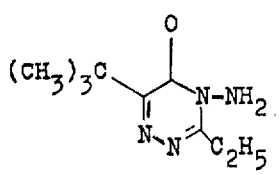

(hereinafter Compound 1)

Variant (a):

24.1 g (0.1035 mole) of 1-tert.-butyl-1-methoxycarbonyl-4-chloro-4-ethyl-2,3-diazabutadiene were, with external cooling, added dropwise (with stirring) to a solution of 15.6 ml (0.32 mole) of hydrazine hydrate in 100 ml of isopropanol in such a manner that the internal temperature did not exceed 40°C. After subsidence of the exothermic reaction, distillation of the solvent was effected, the residue was treated with water, and the reaction product was filtered off with suction. There were obtained 19.9 g (94.4% of the theory) of 3-ethyl-4-amino-6-tert.-butyl-1,2,4-triazin-5-one of the melting poiont 149°–151°C. By boiling up with 100 ml cyclohexane, during which the impurity present was dissolved, suction filtration at 15°C and drying at 50°C in a vacuum, the melting point rose to 154°C. The yield of pure triazinone was 18.4 g (91% of the theory).

Variant (b):

7.1 g of the 92%-strength crude product 1-tert.-butyl-1-chlorocarbonyl-4-chloro-4-ethyl-2,3-diazabutadiene (0.0021 mole) were added dropwise at a temperature of 20°C to 30°C with stirring, to a solution of 7.5 ml (0.14 mole) of hydrazine hydrate in 50 ml of isopropanol.

The working up took place as stated under (a).

2.1 g (51.3% of the theory) 3-ethyl-4-amino-6-tert.-butyl-1,2,4-triazin-5-one of the melting point 154°C were obtained.

EXAMPLE 2

3-ethyl-4-amino-6-phenyl-1,2,4-triazin-5-one.

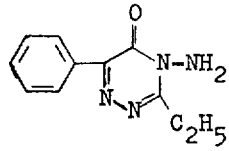

(Compound 2)

To a solution of 26.7 g (0.1 mole) of 1-phenyl-1-ethoxy-carbonyl-4-chloro-4-ethyl-2,3-diazabutadiene in 100 ml of dimethyl formamide there were added dropwise at a temperature of 5°C to 10°C, with stirring, 10.0 g (0.2 mole) of hydrazine hydrate dissolved in 20 ml of dimethyl formamide. After three hours' stirring, 250 ml of water were added to the reaction mixture. The latter was left to stand overnight. Thereafter, suction filtration from the precipitated solid matter was effected; the latter was washed thoroughly with water and dried. The yellowish-white crude product (17.4 g = 80% of the theory) was purified by recrystallization from isopropanol/water. 14.5 g (67.1% of the theory) of 3-ethyl-4-amino-6-phenyl-1,2,4-triazin-5-one of the melting point 164°C were obtained.

EXAMPLE 3

3-cyclopropyl-4-amino-6-phenyl-1,2,4-triazin-5-one.

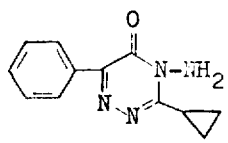

(Compound 3)

To a solution of 53.0 g (0.2 mole) of 1-phenyl-1-ethoxy-carbonyl-4-chloro-4-cyclopropyl-2,3- diazabutadiene in 200 ml of acetonitrile there were added dropwise, at a temperature of 0°C to 5°C, 20 g (0.4 mole) of hydrazine hydrate dissolved in 100 ml of acetonitrile. Subsequently, stirring was effected for one hour at room temperature, the reaction solution was concentrated to one third, water was added and suction filtration from the precipitate so formed was effected. After recrystallization from methanol/water, 26.5 g (58% of the theory) of 3-cyclopropyl-4-amino-6-phenyl-1,2,4-triazin-5-one of the melting point 121°C were obtained.

EXAMPLE 4

3-methyl-4-amino-6-(4'-methoxy-phenyl)-1,2,4-triazin-5-one.

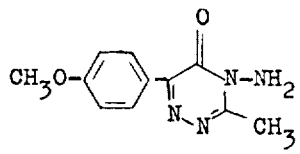 (Compound 4)

To a solution of 7.5 g (0.23 mole) of anhydrous hydrazine in 100 ml of acetonitrile there was added dropwise at a temperature of about 0°C a solution of 28.3 g (0.1 mole) of 1-(4'-methoxyphenyl)-1-ethoxycarbonyl-4-chloro-4-methyl-2,3-diazabutadiene in 100 ml of acetonitrile. After that, stirring was effected for 12 hours at room temperature. After the solvent had been distilled off, the residue was taken up in ethyl acetate and this solution was washed with water. The dried ester solution was freed from solvent. The oily residue remaining behind crystallized when rubbed with ether. There were obtained 15 g (65% of the theory) of 3-methyl-4-amine-6-(4'-methoxy-phenyl)-1,2,4-triazin-5-one of the melting point 203°C to 206°C; after recrystallization from ethanol, the melting point was 206°C.

EXAMPLE 5

3-ethyl-4-methyl-6-tert.-butyl-1,2,4-triazin-5-one.

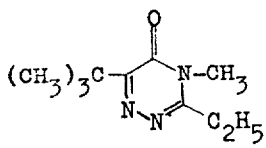 (Compound 5)

To a solution of 9.3 g (0.3 mole) of methylamine in 80 ml of isopropanol there were added dropwise at a temperature of 10°C to 20°C, with stirring 23.25 g (0.1 mole) of 1-tert.-butyl-1-methoxycarbonyl-4-chloro-4-ethyl-2,3-diazabutadiene. Thereafter, stirring at room temperature was effected for 3 hours and the reaction solution was left at room temperature overnight. After brief heating to 80°C, the solvent was distilled off in a vacuum, the residue was taken up with water, and the triazinone insoluble therein was filtered off. 16.7 g of crude product of the melting point 108°C to 112°C were obtained which, after recrystallization from petrol for cleaning, yielded 15.1 g (77% of the theory) of pure 3-ethyl-4-methyl-6-tert.-butyl-1,2,4-triazin-5-one of the melting point 112°C to 113°C.

EXAMPLE 6

3-ethyl-4-methyl-6-phenyl-1,2,4-triazin-5-one.

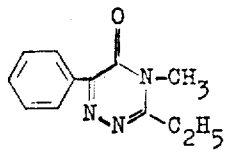 (Compound 6)

To a solution of 26.7 g (0.1 mole) of 1-phenyl-1-ethoxy-carbonyl-4-chloro-4-ethyl-2,3-diazabutadiene in 100 ml acetonitrile there was added dropwise at a temperature of 0°C a solution of 15 g (0.48 mole) of methylamine in 100 ml of acetonitrile. Thereafter, stirring was effected for 15 hours at room temperature, and heating to the boil was subsequently effected for 6 hours. After completion of the reaction, the solvent was distilled off in a vacuum, the residue was taken up with ethyl acetate, and washing with water was effected. The ethyl acetate solution was dried and the solvent was distilled off in a vacuum. The oily residue crystallized when rubbed with ether. There were obtained 11.8 g (55% of the theory) of 3-ethyl-4-methyl-6-phenyl-1,2,4-triazin-5-one as colorless crystals of the melting point 179°C to 180°C which, after recrystallization from a twenty-fold amount of benzene, rose to 181°C.

EXAMPLE 7

3-ethyl-4-allyl-6-(4'-methylphenyl)-1,2,4-triazin-5-one.

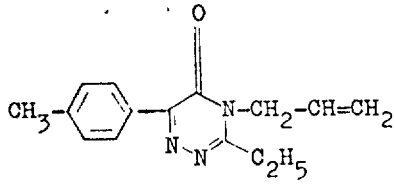 (Compound 7)

To a solution of 15 g (0.26 mole) of allylamine in 100 ml of acetonitrile there was added dropwise at a temperature of 0°C to 5°C a solution of 29 g (0.1 mole) of 1-(4'-methylphenyl)-1-ethoxycarbonyl-4-chloro-4-ethyl-2,3-diazabutadiene in 100 ml of acetonitrile. After 12 hours' stirring at room temperature, the reaction mixture was heated to the boil for 3 hours; subsequently, the solvent was distilled off in a vacuum, the residue was rubbed with water and taken up with ethyl acetate. The ester solution was dried and the solvent was distilled off in a vacuum. The oily residue obtained crystallized when rubbed with ether. There were obtained 12 g (48% of the theory) of 3-ethyl-4-allyl-6-(4'-methylphenyl)-1,2,4-triazin-5-one of the melting point 93°C to 98°C which, after recrystallization from a thirty-fold amount of ligroin, rose to 101°C to 102°C.

EXAMPLE 8

3-ethyl-4-hydroxy-6-phenyl-1,2,4-triazin-5-one.

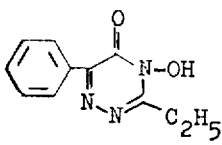 (Compound 8)

To a solution of 14.9 g (0.059) of 1-phenyl-1-methoxy-carbonyl-4-chloro-4-ethyl-2,3-diazabutadiene in 50 ml isopropanol there was added dropwise a mixture of 6.2 g (0.089 mole) of hydroxylamine hydrochloride and 15.0 g (0.148 mole) of triethylamine in 150 ml of isopropanol. The temperature rose from 20°C to 35°C. Subsequently, boiling under reflux was effected for 2 hours, the solvent was distilled off in a vacuum and the residue was treated with water; the residue crystallized. There were obtained 8.6 g (67% of the theory) of crude product of the melting point 160°C to 165°C and, after recrystallization from 70 ml of methanol, 5.2 g (40.5% of the theory) of pure 3-ethyl-4-hydroxy-6-phenyl-1,2,4-triazin-5-one of the melting point 171°C to 171.5°C.

In a manner analogous to that described above, the compounds of the Table 1 were obtained:

EXAMPLE A:

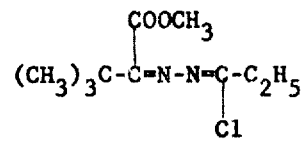

A solution of 42.8 g (0.2 mole) of 1-tert.-butyl-glyoxylic acid methyl ester 2-propionylhydrazone in 50 ml of methylene chloride was added dropwise, with stirring, at a temperature of 20° to 30°C — external cooling being necessary since the reaction proceeds exothermally — to a suspension of 41.7 g (0.2 mole) of phosphorus pentachloride in 150 ml of methylene chloride. When the phosphorus pentachloride had completely dissolved, the reaction mixture was heated under reflux until the cessation of evolution of gas.

Table 1

(1)

| Example No. | $R^1$ | $R^2$ | $R^3$ | Melting point °C |
|---|---|---|---|---|
| 9 | $NH_2$ | methyl | tert.-butyl | 158–159 |
| 10 | $NH_2$ | tert.-butyl | tert.-butyl | 165.5 |
| 11 | $NH_2$ | n-propyl | isopropyl | 95.5 |
| 12 | $NH_2$ | cyclopropyl | tert.-butyl | 109–110 |
| 13 | $NH_2$ | isopropyl | tert.-butyl | 140–141 |
| 14 | $NH_2$ | cyclopentyl | tert.-butyl | 196.5 |
| 15 | $NH_2$ | cyclohexyl | tert.-butyl | 175–180 |
| 16 | $NH_2$ | phenyl | tert.-butyl | 126–127 |
| 17 | $NH_2$ | H | tert.-butyl | 113–114 |
| 18 | $NH_2$ | methyl | phenyl | 167–169 |
| 19 | $NH_2$ | isopropyl | phenyl | 126–127 |
| 20 | $NH_2$ | n-propyl | phenyl | 104–106 |
| 21 | $NH_2$ | n-butyl | phenyl | 138–139 |
| 22 | $NH_2$ | sec.-butyl | phenyl | 92 |
| 23 | $NH_2$ | tert.-butyl | phenyl | 138 |
| 24 | $NH_2$ | cyclohexyl | phenyl | 182 |
| 25 | $NH_2$ | methyl | 4-methyl-phenyl | 199 |
| 26 | $NH_2$ | ethyl | 4-methyl-phenyl | 148 |
| 27 | $NH_2$ | ethyl | 4-methoxy-phenyl | 164–166 |
| 28 | $NH_2$ | isopropyl | 4-methoxy-phenyl | 131–132 |
| 29 | $NH_2$ | ethyl | 3,4-dimethoxy-phenyl | 167–168 |
| 30 | $NH_2$ | methyl | 4-chlorophenyl | 97 |
| 31 | $NH_2$ | ethyl | 4-chlorophenyl | 156 |
| 32 | $NH_2$ | n-propyl | 4-chlorophenyl | 120.5 |
| 33 | $NH_2$ | cyclopropyl | 4-chlorophenyl | 161.5 |
| 34 | $NH_2$ | isopropyl | 4-chlorophenyl | 145–147 |
| 35 | $NH_2$ | n-butyl | 4-chlorophenyl | 152–153 |
| 36 | $NH_2$ | tert.-butyl | 4-chlorophenyl | 179–181 |
| 37 | $NH_2$ | cyclohexyl | 4-chlorophenyl | 180–181 |
| 38 | OH | ethyl | tert.-butyl | 132 |
| 39 | OH | tert.-butyl | tert.-butyl | 160–162 |
| 40 | $CH_3$ | cyclopropyl | tert.-butyl | 89–91 |
| 41 | $CH_3$ | tert.-butyl | tert.-butyl | 114 |
| 42 | $CH_3$ | methyl | phenyl | 151 |
| 43 | $CH_3$ | n-propyl | phenyl | 106 |
| 44 | $CH_3$ | isopropyl | phenyl | 101 |
| 45 | $CH_3$ | methyl | 4-methyl-phenyl | 156 |
| 46 | $CH_3$ | ethyl | 4-methyl-phenyl | 135 |
| 47 | H | ethyl | tert.-butyl | 154–155 |
| 48 | H | isopropyl | phenyl | 197 |
| 49 | H | tert.-butyl | phenyl | 256–258 |
| 50 | $CH_2CH_2OH$ | ethyl | phenyl | 118.5 |
| 51 | phenyl | ethyl | phenyl | 147–149 |
| 52 | $CH_3$ | cyclopentyl | tert.-butyl | 93–94 |
| 53 | $NH_2$ | isopropyl | 4-methoxyphenyl | 132 |
| 54 | $NH_2$ | cyanomethyl | tert.-butyl | 156–157 |
| 55 | $CH_3$ | cyanomethyl | tert.-butyl | 217–218 |
| 56 | $NH_2$ | propyl | tert.-butyl | 105–106 |
| 57 | $CH_3$ | propyl | tert.-butyl | 67–68 |
| 58 | $NH_2$ | n-butyl | tert.-butyl | 94–96 |
| 59 | $CH_3$ | n-butyl | tert.-butyl | 111–112 |
| 60 | $NH_2$ | isobutyl | tert.-butyl | 140–142 |
| 61 | $CH_3$ | isobutyl | tert.-butyl | 60–63 |
| 62 | $NH_2$ | ethoxymethyl | tert.-butyl | 64–67 |

The preparation of the starting materials (diazabutadienes) of the formula (II) is illustrated below.

Thereafter, the solvent was distilled off and the phosphorus oxychloride formed with distilled off too at 0.015 mm Hg and 30°C bath temperature. As residue, there remained behind a yellowish oil which was sufficiently pure for further reactions. When purification by distillation in a vacuum was effected there were obtained 42.5 g (87% of the theory) of 1-tert.-butyl-1-methoxycarbonyl-4-chloro-4-ethyl-2,3-diazabutadiene of the boiling point 64°C/0.008 mm Hg and refractive index $n_D^{20}$ 1.4654.

Process variant:

Through a solution of 42.8 g (0.2 mole) of 1-tert.-butylglyoxylic acid methyl ester 2-propionylhydrazone in 100 ml of carbon tetrachloride there was passed, after addition of 2 ml of dimethyl formamide, a slow phosgene stream for 2½ hours at a reaction temperature of 50°C to 60°C. Besides unconsumed phosgene, much hydrogen chloride passed out of the delivery tube of the reaction vessel. After completion of the reaction, heating to the boil was effected and, in order to remove the residual phosgene and hydrogen chloride, nitrogen was simultaneously introduced. The solvent was then distilled off in a vacuum and the residue was kept for some minutes at 50°C/0.1 mm Hg. 44.7 g of an oil were obtained which contained, besides 1-tert.-butyl-1-methoxycarbonyl-4-chloro-4-ethyl-2,3-diazabutadiene, a small amount of the starting material as by-product. The yield determined by gas chromatography was 57.4% of the theory.

The 1-tert.-butylglyoxylic acid methyl ester 2-hydrazone required as starting material was prepared as follows:

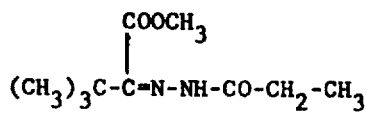

66 g (0.75 mole) of propionic acid hydrazide and 300 ml methylene chloride were added to 1.1 litres of an aqueous solution of the potassium salt of 2,2-dimethyl-1-oxobutyric acid (preparation was effected according to Monatshefte f. Chemie 10 (1889), 770) which contained 0.75 mole of this acid. 93 ml of concentrated hydrochloric acid were added dropwise in 2 hours, with vigorous stirring; stirring was effected for a further 6 hours, the mixture was allowed to settle and the two phases were separated. The aqueous phase was extracted twice with, in each case, 200 ml of methylene chloride. The combined organic extracts were dried over calcium chloride and distilled in a vacuum. An oil was obtained which gradually solidified and yielded 135 g (90% of the theory) of 1-tert.-butylgloxylic acid 2-propionylhydrazone of the melting point 103°C to 105°C (from petroleum ether).

The free 1-tert.-butylglyoxylic acid 2-propionylhydrazone was subsequently converted into its potassium salt by treatment with an equivalent amount of potassium carbonate.

24 g (0.077 mole) of potassium propionylhydrazone tert.-butylglyoxylate were dissolved in 120 ml of chlorobenzene, 12 ml (0.09 mole) of dimethyl sulfate were added and stirring was effected for 5 hours at 80°C. After suction filtration of the potassium salts formed, and washing with chlorobenzene, the solvent was distilled off in a vacuum. The oil remaining behind could be purified by distillation in a high vacuum.

There were obtained 19.2 g (90% of the theory) of 1-tert.-butyloxylic acid methyl ester 2-propionylhydrazone of the boiling point b.p. 90°C to 19°C/0.006 mm Hg and of the melting point 28°C to 29°C.

EXAMPLE B:

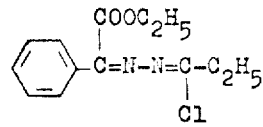

37.2 g (0.145 mole) of 1-phenyl-1-chlorocarbonyl-4-chloro-4-ethyl-2,3-diazabutadiene were added dropwise, with ice cooling, to a sodium ethylate solution of 6.9 g (0.3 mole) of sodium in 150 ml of ethanol. Thereafter, the reaction mixture was filtered, the solvent was distilled off and the residue was taken up with ether. The ethereal solution was washed twice with, in each case, 100 ml of water, dried, and evaporated to dryness. There were obtained 31.8 g (90.3% of the theory) of 1-phenyl-1-ethoxy-carbonyl-4-chloro-4-ethyl-2,3-diazabutadiene as a viscous oil which could not be distilled; $n_D^{24}$ = 1.5569.

The 1-phenyl-1-chlorocarbonyl-4-chloro-4-ethyl-2,3-diazabutadiene used as the starting material could be prepared as follows:

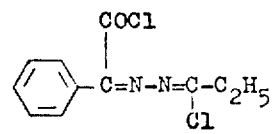

A solution of 150 g (1 mole) of phenylglyoxylic acid in 300 ml of water and a solution of 88 g (1 mole) of propionylhydrazine in 100 ml of water were added together and cooled to +10°C. After three to four hours' standing, filtration from the precipitate so formed was effected. 196 g (89% of the theory) of phenylglyoxylic acid 2-propionylhydrazone of the melting point 156°C were obtained.

44 g (0.2 mole) of phenylglyoxylic acid 2-propionylhydrazone were suspended in 250 ml of dichloromethane, and 83.2 g (0.4 mole) of phosphorus pentachloride were added in portions. Stirring at room temperature was effected until a clear solution had formed and evolution of hydrogen chloride had ceased. By distillation in a vacuum, 37.2 g (72% of the theory) of 1-phenyl-1-chlorocarbonyl-4-chloro-4-ethyl-2,3-diazabutadiene were obtained as a colorless liquid of the boiling point 127°C/0.2 mm Hg.

EXAMPLE C:

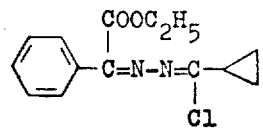

52.0 g (0.21 mole) of phenylglyoxylic acid ethyl ester 2-cyclopropylcarbonylhydrazone were dissolved in 300 ml methylene chloride, and 41.6 g (0.2 mole) of phosphorus pentachloride were added in portions. Stirring was effected until complete solution had occurred. The solvent and the phosphorus oxychloride formed were then distilled off in a vacuum. As residue, 53 g (94.6% of the theory) of 1-phenyl-1-ethoxycarbonyl-4-chloro- 4-cyclopropyl-2,3-diazabutadiene of the refractive index $n_D^{24}$ 1.5679 were obtained.

The starting material was prepared as follows:

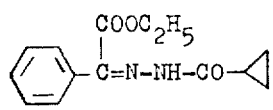

89.0 g (0.5 mole) of phenylglyoxylic acid ethyl ester were dissolved in 150 ml of methanol, and 50 g (0.5 mole) of cyclopropanecarboxylic acid hydrazide (melting point 97°C) were added. The reaction mixture was heated to the boil for 30 minutes under reflux, cooling was effected, the mixture was allowed to stand for some hours and suction filtration from the precipitate so formed was effected. By concentration of the filtrate, a further precipitate was obtained. The combined residues on the filter were washed with a little cold methanol and ether, and dried.

120 g (92% of the theory) of 1-phenylglyoxylic acid ethyl ester 2-cyclopropylcarbonylhydrazone of the melting point 116°–120°C were obtained.

EXAMPLE D:

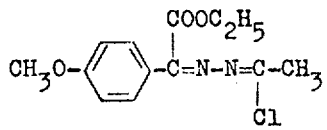

To a solution of 24 g (0.1 mole) of 1-(4'-methoxy)-phenylglyoxylic acid ethyl ester 2-acetylhydrazone in 250 ml of methylene chloride there were added at a temperature of −5°C, with stirring, 20.8 g (0.1 mole) of phosphorus pentachloride in portions. After stirring for half an hour at −5°C, the reaction mixture was poured into 1 litre of ice water which contained 100 g of sodium hydrogen carbonate. The organic phase was separated and dried. After the solvent had been distilled off, 24.5 g of crude (95% of the theory) 1-(4'-methoxy)-phenyl-1-ethoxycarbonyl-4-chloro-4-methyl-2,3-diazabutadiene remained behind as oil ($n_D^{21}$ = 1.5545).

The starting material 1-(4'-methoxy)-phenylglyoxylic acid ethyl ester 2-acetylhydrazone was prepared by reaction of (4'-methoxy)-phenylglyxoylic acid ethyl ester and acetylhydrazine in boiling ethanol and had a melting point of 91°C.

EXAMPLE E:

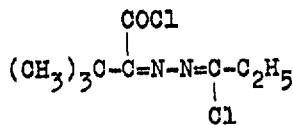

To a suspension of 104 g (0.5 mole) of phosphorus pentachloride in 150 ml of methylene chloride there was added dropwise, with stirring, a solution of 50 g (0.25 mole) of 1-tert.-butylglyoxylic acid 2-propionylhydrazone in 50 ml of methylene chloride, and the reaction mixture was boiled under reflux until the cessation of evolution of hydrogen chloride. Thereafter, the solvent and the phosphorus oxychloride formed were distilled off in a vacuum and the residue likewise was distilled in a vacuum. There were obtained 52 g (81.4% of the theory) of 1-tert.-butyl-1-chlorocarbonyl-4-chloro-4-ethyl-2,3-diazabutadiene of the boiling point 61°C to 62°C/0.02 mm Hg.

For the cyclization reactions to give 3-alkyl-1,2,4-triazin-5-ones a purification by distillation was not necessary. The crude product, which contained 92% diazabutadiene, could be used.

The starting material 1-tert.-butylglyoxylic acid 2-propionylhydrazone was prepared as described in Example a.

Analogously, the 4-chloro-2,3-diazabutadienes stated in the following Table could be prepared:

Table 2

$$R^3-\overset{\overset{COR^6}{|}}{C}=N-N=\overset{\overset{}{|}}{\underset{Cl}{C}}-R^2 \quad (II)$$

| Example No. | $R^2$ | $R^3$ | $R^6$ | Boiling point °C/mm Hg Refractive index $n_D^{20}$ |
|---|---|---|---|---|
| f | C(CH₃)₃ | C(CH₃)₃ | OCH₃ | 83/0.02 1.4651 |
| g | ◁ | C(CH₃)₃ | OCH₃ | oil |
| h | ⟨H⟩ | C(CH₃)₃ | OCH₃ | oil |
| i | CH₂CN | C(CH₃)₃ | OCH₃ | 110/0.01 1.4811 |
| k | ⟨phenyl⟩ | C(CH₃)₃ | OCH₃ | 116/0.008 1.5431 |
| l | C₂H₅ | ⟨phenyl⟩ | OCH₃ | oil |

The 1,2,4-triazin-5-ones of the formula (I) have pesticidal, in particular herbicidal, properties and can therefore be used for the control of weeds.

By weeds in the widest sense are meant all plants which grow in places where they are not desired. Whether the active compounds according to the invention act as total or selective herbicidal agents depends on the magnitude of the applied amount of active compound.

The active compounds according to the invention can be used for example in the case of the following plants: dicotyledons, such as mustard (Sinapis), cress (Lepidium), cleavers (Galium), chickweed (Stellaria), chamomile (Matricaria), gallant soldier (Galinsoga), goosefoot (Chenopodium), annual nettle (Urtica), groundsel (Senecio), cotton (Gossypium), beets (Beta), carrots (Daucus), beans (Phaseolus), potatoes (Solanum) and coffee (Coffea); and monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum) and sugar cane (Saccharum).

The herbicidal acitivty of the active compounds according to the invention is based on the inhibition of the photosynthesis process, which is localized in the chloroplasts of the higher plants. The photosynthesis process can be split up into three reaction steps:

1. Photolysis of water (Hill reaction).
2. Photophosphorylation.
3. Assimilation of carbonic acid.

According to our present-day knowledge, step 1 consists of an electron transport system which can be split up into two light reactions which overcome in two stages the potential difference between $H_2O/O_2$ and $NADPH_2/NADP$ and which are connected with each other through a series of redox catalysts (see Berichte der Deutschen Botanischen Gesellschaft 77, 123 (1964); Zeitschrift fur Angewandte Chemie 77, 281 (1965)).

It is known that the herbicide 2-chloro-4-6-bis-ethylamino-1,3,5-triazine inhibits the whole of reaction step 1 (see Experientia 14, 136–137 (1958)). Furthermore, it is known that herbicides of the benzimidazole and imidazole type, particularly 2-trifluoromethyl-substituted benzimidazoles, are inhibitors of the photosynthetic electron transport in the range of the second light reaction (see Zeitschrift fur Naturforschung Volume 21 b, No. 3, pages 243–254, 1966). With the aid of the photosynthetic evolution of $O_2$ in a Hill reaction with potassium ferricyanide as acceptor or isolated chloro-lasts — which are obtained by trituration of spinach leaves and differential centrifuging of the extract — an inhibition or suppression of the Hill reaction can be measured. The $PI_{50}$ value (negative logarithm of the molar concentration which produces a 50% inhibition of the Hill reaction) is then a measure for the inhibition of the photosynthesis process in higher plants and thus an index for the herbicidal activity of the active compounds according to the invention (see Example C and Table C herein).

The active compounds according to the present invention can be converted into the usual formulations, such as solutions, emulsions, suspensions, powders, pastes and granulates. These may be produced in known manner, for example by mixing the active compounds with extenders, that is, liquid or solid or liquefied gaseous diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulphoxide or acetonitrile, as well as water.

By liquefied gaseous diluents or carriers are meant liquids which would be gaseous at normal temperatures and pressures, for example aerosol propellants, such as halogenated hydrocarbons, for example freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or silicates.

Preferred examples of emulsifying agents include nonionic and anionic emulsifiers, such as polyoxyethylenefatty acid esters, polyoxyethylene-fatty alcohol ethers, for example alkylarylpolyglycol ethers, alkyl sulfonates, alkyl sulfates and aryl sulfonates; and preferred examples of dispersing agents include lignin, sulfite waste liquors and methyl cellulose.

The active compounds according to the invention may be present in the formulations in admixture with other active compounds. The formulations contain, in general, from 0.1 to 95, preferably from 0.5 to 90, per cent by weight of active compound.

The active compounds may be applied as such, in the form of their formulations or in the application forms prepared therefrom, such as ready-to-use solutions, emulsions, suspensions, powders, pastes and granulates. Application may be effected in any usual manner, for example by dusting, spraying, squirting, watering or scattering.

The applied amount of the active compound may be varied within a fairly wide range: it depends essentially on the nature of the desired effect. In general, applied amounts of from 0.1 to 20 kg, preferably from 0.2 to 15 kg. of active compound per hectare are used.

The present invention also provides a herbicidal composition containing as active ingredient a compound of the present invention in admixture with a solid or liquefied gaseous diluent or carrier or in admixture with a liquid diluent or carrier containing a surface-active agent.

The present invention also provides a method of combating weeds which comprises applying to the weeds or a weed habitat a compound of the present invention alone or in the form of a composition containing as active ingredient a compound of the present invention in admixture with a diluent or carrier.

The present invention further provides crops protected from damage by weeds by being grown in areas in which immediately prior to and/or during the time of the growing a compound of the present invention was applied along or in admixture with a diluent or carrier. It will be seen that the usual methods of providing a harvested crop may be improved by the present invention.

The herbicidal activity of the compounds of this invention is illustrated in and by the following test Examples:

EXAMPLE A

Pre-emergency test
Solvent: 5 parts by weight acetone
Emulsifier: 1 part by weight alkylarylpolyglycol ether To produce a suitable preparation of active compound, 1 part by weight of active compound was mixed with the stated amount of solvent, the stated amount of emulsifier was added and the concentrate was then diluted with water to the desired concentration.

Seeds of the test plants were sown in normal soil and, after 24 hours, watered with the preparation of the active compound. It was expedient to keep constant the amount of water per unit area. The concentration of the active compound in the preparation was of no importance, only the amount of active compound applied per unit area being decisive. After three weeks, the degree of damage to the test plants was determined and characterized by the values 0–5, which had the following meaning:

0 no effect
1 slight damage or delay in growth
2 marked damage or inhibition of growth
3 heavy damage and only deficient development or only 50% emerged
4 plants partially destroyed after germination or only 25% emerged
5 plants completely dead or not emerged.

The active compounds, the amounts applied and the results obtained can be seen from the following Table:

TABLE A

| Active compound | | Active compound applied kg/hectare | Pre-emergence test | | | | | | | | | | |
|---|---|---|---|---|---|---|---|---|---|---|---|---|---|
| | | | Echino-chloa | Cheno-podium | Sina-pis | Stel-laria | Lo-lium | Galin-soga | Matri-caria | Oats | Cotton | Wheat | Maize |
| 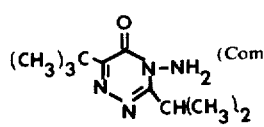 | (Compound 13) | 10<br>5<br>2.5<br>1.25<br>0.625 | 5<br>5<br>5<br>5<br>4–5 | 5<br>5<br>5<br>5<br>5 | 5<br>5<br>5<br>5<br>4–5 | 5<br>5<br>5<br>5<br>5 | 5<br>5<br>5<br>5<br>5 | 5<br>5<br>5<br>4–5<br>4–5 | 5<br>5<br>4–5<br>4–5<br>4–5 | 5<br>5<br>5<br>5<br>4 | 4–5<br>4<br>4<br>3–4<br>3 | 4–5<br>4–5<br>4–5<br>4–5<br>3–4 | 4–5<br>4<br>4<br>3–4<br>3 |
| 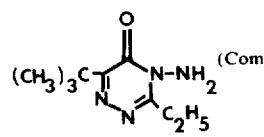 | (Compound 1) | 10<br>5<br>2.5<br>1.25<br>0.625 | 5<br>5<br>5<br>5<br>5 | 5<br>5<br>5<br>5<br>5 | 5<br>5<br>5<br>5<br>5 | 5<br>5<br>5<br>5<br>5 | 5<br>5<br>5<br>4–5<br>4 | 4–5<br>4–5<br>4–5<br>4–5<br>4–5 | 5<br>4–5<br>4–5<br>4–5<br>4–5 | 5<br>5<br>5<br>5<br>5 | 4–5<br>4–5<br>4–5<br>4–5<br>4 | 3<br>2<br>2<br>2<br>2 | 4<br>4<br>3<br>3<br>2 |
| 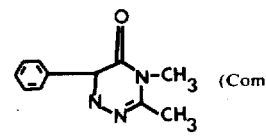 | (Compound 42) | 20<br>10 | 4–5<br>4–5 | —<br>— | 5<br>5 | —<br>— | —<br>— | —<br>— | —<br>— | 3<br>3 | 3<br>3 | 4<br>4 | —<br>— |
| 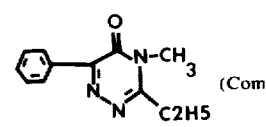 | (Compound 6) | 20<br>10 | 5<br>5 | —<br>— | 5<br>5 | —<br>— | —<br>— | —<br>— | —<br>— | 4–5<br>4–5 | 4<br>4 | 4<br>4 | —<br>— |
| 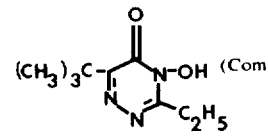 | (Compound 38) | 10<br>5<br>2.5<br>1.25<br>0.625 | 5<br>5<br>5<br>4–5<br>4 | 5<br>5<br>5<br>5<br>5 | 5<br>5<br>5<br>5<br>4 | 5<br>5<br>5<br>5<br>5 | 5<br>5<br>5<br>5<br>4–5 | 5<br>5<br>5<br>5<br>5 | 5<br>5<br>5<br>4–5<br>4 | 5<br>5<br>4<br>3<br>3 | 5<br>4<br>4<br>3<br>2 | 5<br>4<br>3<br>2<br>2 | 4<br>4<br>3<br>3<br>1 |
| 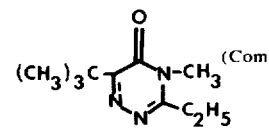 | (Compound 5) | 10<br>5<br>2.5<br>1.25<br>0.625 | 5<br>5<br>5<br>4<br>3 | 5<br>5<br>5<br>5<br>4–5 | 5<br>5<br>5<br>4<br>3 | 5<br>5<br>5<br>5<br>4–5 | 5<br>5<br>4–5<br>4–5<br>4 | 5<br>5<br>5<br>5<br>5 | 5<br>5<br>4–5<br>4<br>4 | 4–5<br>4<br>4<br>3<br>2 | 5<br>4<br>3<br>2<br>2 | 5<br>4<br>3<br>2<br>2 | 4<br>4<br>3<br>2<br>2 |

EXAMPLE B

Post-emergence test
Solvent: 5 parts by weight acetone
Emulsifier: 1 part by weight alkylarylpolyglycol ether To produce a suitable preparation of active compound, 1 part by weight of active compound was mixed with the stated amount of solvent, the stated amount of emulsifier was added and the concentrate was then diluted with water to the desired concentration.

Test plants which had a height of 5–15 cm were sprayed with the preparation of the active compound so that the amounts of active compound per unit area which were stated in the Table was applied. Depending on the concentration of the spray liquor, the amount of water applied lies between 1000 and 2000 litres/hectare. After three weeks, the degree of damage to the plants was determined and characterized by the values 0–5, which had the following meaning:

0 no effect
1 a few slightly burnt spots
2 marked damage to leaves
3 some leaves and parts of stalks partially dead
4 plant partially destroyed
5 plant completely dead.

The active compounds, the amounts applied and the results can be seen from the following Table:

Table B

| Active compound | Active compound applied kg/hectare | Post emergence test Echi- nochloa | Cheno- podium | Sinapis | Oats | Cotton | Wheat | Beans |
|---|---|---|---|---|---|---|---|---|
| 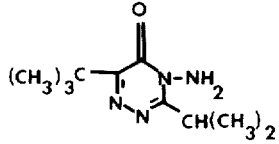 (Compound 13) | 2<br>1<br>0.5<br>0.25<br>0.125 | 5<br>5<br>5<br>4-5<br>4-5 | 5<br>5<br>5<br>5<br>5 | 5<br>5<br>5<br>5<br>5 | 5<br>4-5<br>4-5<br>3<br>2 | 5<br>5<br>5<br>4-5<br>4 | 5<br>5<br>4-5<br>3<br>2 | 5<br>5<br>4-5<br>4<br>3-4 |
| 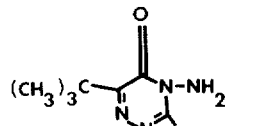 (Compound 1) | 2<br>1<br>0.5<br>0.25<br>0.125 | 5<br>5<br>5<br>5<br>4-5 | 5<br>5<br>5<br>4-5<br>4-5 | 5<br>5<br>5<br>5<br>5 | 5<br>5<br>5<br>4-5<br>4-5 | 5<br>5<br>5<br>5<br>5 | 5<br>5<br>4-5<br>4-5<br>4 | 5<br>5<br>5<br>5<br>4 |
| 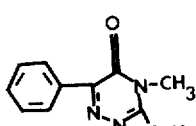 (Compound 6) | 2<br>1<br>0.5<br>0.25<br>0.125 | 5<br>5<br>5<br>5<br>5 | —<br>—<br>—<br>—<br>— | 5<br>5<br>5<br>5<br>5 | —<br>5<br>5<br>5<br>5 | 5<br>5<br>5<br>5<br>5 | 5<br>5<br>4-5<br>4-5<br>4 | 5<br>5<br>4-5<br>4-5<br>4 |
| 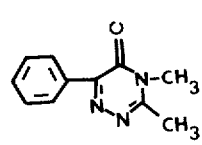 (Compound 42) | 2<br>1<br>0.5<br>0.25<br>0.125 | 5<br>5<br>4-5<br>4<br>3 | —<br>—<br>—<br>—<br>— | 5<br>5<br>5<br>5<br>5 | 5<br>4-5<br>4-5<br>4<br>3 | 5<br>5<br>4-5<br>4<br>4 | 5<br>5<br>4-5<br>4-5<br>4 | 5<br>5<br>4-5<br>4<br>4 |
| 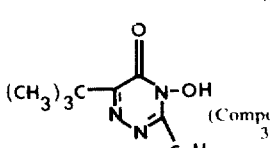 (Compound 38) | 2<br>1<br>0.5<br>0.25<br>0.125 | 5<br>5<br>4-5<br>4-5<br>2 | 5<br>5<br>5<br>5<br>4-5 | 5<br>5<br>5<br>5<br>4-5 | 5<br>4<br>4<br>3<br>3 | 5<br>4-5<br>3<br>2<br>2 | 4-5<br>4<br>4<br>3<br>3 | 5<br>5<br>4<br>3<br>3 |
| 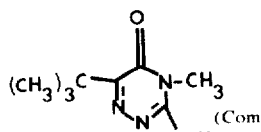 (Compound 5) | 2<br>1<br>0.5<br>0.25<br>0.125 | 5<br>4-5<br>4-5<br>3<br>2 | 5<br>5<br>5<br>4-5<br>3 | 5<br>5<br>5<br>4-5<br>4-5 | 5<br>4<br>4<br>3<br>2 | 4<br>4<br>3<br>2<br>2 | 4-5<br>4-5<br>4<br>3<br>3 | 4-5<br>4<br>3<br>2<br>2 |

EXAMPLE C

Determination of the $pI_{50}$ value in a Hill reaction.

The test was carried out with broken chloroplasts of spinach leaves. They were obtained according to Arnon by trituration of spinach leaves in 0.35 M NaCl + 10% 0.2 M tris amine buffer pH8 and differential centrifuging. The whole chloroplasts so obtained were broken up osmotically in water and the chloroplast fragments were centrifuged off at high speed from the aqueous chloroplast extract. The reaction was carried out in conical Warburg vessels of about 15 ml capacity at 15°C. Each vessel contained, in a total volume of 3 ml, the following substances in $\mu$ moles: tris amine buffer pH8 80; $MgCl_2$ 5; ADP 10; inorganic phosphate 10; broken chloroplasts ($P_{1s1}$) with a chlorophyll content of 0.2 mg; and K ferricyanide 20 or menadione or PMS* (N-methylphenazonium methosulfate)0.3, together with the herbicides stated in the Tables. After the vessels had been equilibrated with $N_2$, irradiation was effected for 15 minutes with 35000 lux (Philips Attralux lamps). The evolution of $O_2$ was followed manometrically. The values of the evolution of $O_2$ in the control without inhibitor were about 3 $\mu$ moles $O_2$/15 minutes/vessel, that is 60 $\mu$ moles $O_2$/hour/mg chlorophyll. The $pI_{50}$ value was determined from the straight lines obtained by plotting the inhibition in % against the concentration.

The results are shown in the following Table, in which the compounds are correlated with the corresponding preparative Example given hereinafter.

Table C

Compound

| Ex. No. | R¹ | R² | R³ | 50% inhibition with γ/ml | pI₅₀ |
|---|---|---|---|---|---|
| 9 | $NH_2$ | $CH_3$ | $C(CH_3)_3$ | ≈4 | 4,79 |
| 11 | $NH_2$ | $C_3H_7$ | $CH(CH_3)_2$ | 5 | 4,59 |
| 10 | $NH_2$ | $C(CH_3)_3$ | $C(CH_3)_3$ | 3 | 4,87 |
| 18 | $NH_2$ | $CH_3$ | phenyl | 0,15 | 6,13 |
| 2 | $NH_2$ | $C_2H_5$ | phenyl | 0,015 | 7,26 |
| 20 | $NH_2$ | $C_3H_7$ | phenyl | 0,25 | 5,96 |
| 19 | $NH_2$ | $CH(CH_3)_2$ | phenyl | 0,015 | 7,18 |
| 23 | $NH_2$ | $C(CH_3)_3$ | phenyl | 0,4 | 5,79 |
| 3 | $NH_2$ | cyclopropyl | phenyl | 0,05 | 6,66 |
| 25 | $NH_2$ | $CH_3$ | 4-$CH_3$-phenyl | 3 | 4,86 |
| 26 | $NH_2$ | $C_2H_5$ | 4-$CH_3$-phenyl | 1 | 5,36 |
| 38 | OH | $C_2H_5$ | $C(CH_3)_3$ | 0,25 | 5,89 |
| 8 | OH | $C_2H_5$ | phenyl | 15 | 4,16 |
| 48 | H | $CH(CH_3)_2$ | phenyl | 5,3 | 4,61 |
| 49 | H | $C(CH_3)_3$ | phenyl | 6 | 4,58 |
| 5 | $CH_3$ | $C_2H_5$ | $C(CH_3)_3$ | 3 | 4,81 |
| 42 | $CH_3$ | $CH_3$ | phenyl | 1,7 | 5,07 |
| 6 | $CH_3$ | $C_2H_5$ | phenyl | 0,3 | 5,85 |
| 43 | $CH_3$ | $C_3H_7$ | phenyl | 10 | 4,36 |
| 45 | $CH_3$ | $CH_3$ | 4-$CH_3$-phenyl | 10 | 4,33 |

It will be understood that the specification and examples are illustrative but not limitative of the present invention and that other embodiments within the spirit and scope of the invention will suggest themselves to those skilled in the art.

What is claimed is:

1. Process for the preparation of a 1,2,4-triazin-5-one compound of the formula:

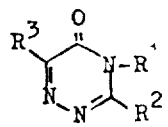

(I)

wherein R¹ is hydrogen, hydroxyl, straight-chain or branched alkyl with up to 6 carbon atoms, which may be substituted by hydroxyl or alkoxy of from 1 to 4 carbon atoms; straight-chain or branched alkenyl or alkynyl with in either case up to 6 carbon atoms, cycloalkyl with 3 to 6 carbon atoms; straight-chain or branched alkoxy with 1 to 4 carbon atoms; aralkyl of from 1 to 2 carbon atoms in the alkyl moiety and 6 to 10 carbon atoms in the aryl moiety, which aralkyl may be substituted by an alkyl, alkoxy or alkylthio radical of from 1 to 4 carbon atoms; or the group $$-N\begin{matrix}R^4\\R^5\end{matrix}$$

in which R⁴ is hydrogen, methyl, ethyl, propyl, isopropyl, or butyl and R⁵ is hydrogen, straight-chain or branched alkyl of from 1 to 4 carbon atoms, haloalkyl of from 1 to 4 carbon atoms and 1 to 3 halogen atoms or a phenyl or phenylalkyl radical, which radical may be substituted by an alkyl, alkoxy or alkylthio group of from 1 to 4 carbon atoms; or R⁴ and R⁵, together with the nitrogen atom to which they are shown attached, form a pyrrolidyl, piperidyl or morpholino radical;

R² is hydrogen, straight-chain or branched alkyl of from 1 to 6 carbon atoms, which may be substituted by hydroxyl, cyano or an alkoxy or alkylthio group of from 1 to 4 carbon atoms; straight-chain or branched alkenyl of from 2 to 6 carbon atoms; cycloalkyl of from 3 to 6 carbon atoms; aralkyl of from 1 to 2 carbon atoms in the alkyl moiety and 6 to 10 carbon atoms in the aryl moiety, which aralkyl may be substituted by hydroxyl, an alkyl, alkoxy or haloalkyl radical of from 1 to 4 carbon atoms or halogen or aryl of from 6 to 10 carbon atoms, which may be substituted by halogen, lower alkyl, alkoxy, hydroxyl, or trifluoromethyl.

R³ is unsubstituted straight-chain or branched alkyl of from 1 to 12 carbon atoms; alkyl of from 1 to 6 carbon atoms substituted by an alkoxy or alkylthio group of from 1 to 4 carbon atoms, by aryloxy of from 6 to 10 carbon atoms or by alkoxycarbonyl of from 1 to 3 carbonyl of from 1 to 3 carbon atoms in the alkyl moiety; straight-chain or branched alkenyl of from 2 to 12 carbon atoms; cycloalkyl of from 3 to 10 carbon atoms; aryl of from 6 to 10 carbon atoms or aralkyl of from 1 to 3 carbon atoms in the alkyl moiety and 6 to 10 carbon atoms in the aryl moiety wherein the two last-mentioned radicals R³ may carry on the aryl radical one or more substituents selected from straight-chain or branched alkyl of from 1 to 4 carbon atoms, alkoxy of from 1 to 4 carbon atoms, alkylthio of from 1 to 4 carbon atoms, halogen, dialkylamino of from 2 to 6 carbon atoms in each alkyl radical, cyano or thiocyano which process comprises reacting a diazabutadiene of the formula:

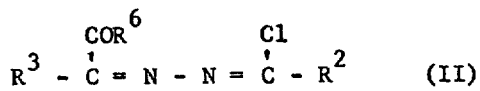

(II)

wherein R² and R³ are defined as above and R⁶ is chlorine or alkoxy
with a compound of the formula:

$$H_2NR^1$$

(III)

wherein R¹ is defined as above, at a temperature between 0°C and 150°C in the presence of an acid-binding agent.

2. Process as claimed in claim 1 for the preparation of a 1,2,4-triazin-5-one compound of the formula:

in which
R¹ is hydrogen, alkyl or substituted alkyl, alkenyl, alkynyl, cycloalkyl, hydroxy, or alkoxy
R² is hydrogen, alkyl, substituted alkyl, alkenyl, or cycloalkyl
R³ is alkyl, substituted alkyl, alkenyl, or cycloalkyl,
which process comprises reacting a diazabutadiene of the formula:

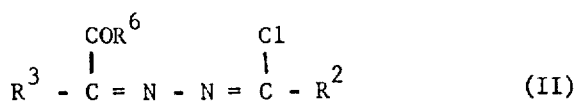

in which
R² and R³ have the meanings stated above, and
R⁶ is chlorine or alkoxy;
with a compound of the formula $$H_2NR^1$$ (III)

in which
R¹ has the meaning stated above,
at a temperature between 0°C in the presence of an acidbinding agent.

3. Process as claimed in claim 1 wherein R¹ is aralkyl of from 1 to 2 carbon atoms in the alkyl moiety and 6 to 10 carbon atoms in the aryl moiety, which aralkyl may be substituted by an alkyl, alkoxy or alkylthio radical of from 1 to 4 carbon atoms, or the group

in which R⁴ is hydrogen, methyl, ethyl, propyl, isopropyl, butyl, sec.-butyl or tert.-butyl and R⁵ is hydrogen, straight-chain or branched alkyl of from 1 to 4 carbon atoms, haloalkyl of from 1 to 4 carbon atoms and 1 to 3 halogen atoms or a phenyl or phenylalkyl radical, which radical may be substituted by an alkyl, alkoxy or alkylthio group of from 1 to 4 carbon atoms, or R⁴ and R⁵, together with the nitrogen atom to which they are shown attached, form a pyrrolidyl, piperidyl or morpholino radical.

4. Process as claimed in claim 1 wherein R² is aralkyl of from 1 to 2 carbon atoms in the alkyl moiety and 6 to 10 carbon atoms in the aryl moiety, which aralkyl may be substituted by hydroxyl, an alkyl, alkoxy or haloalkyl radical of from 1 to 4 carbon atoms or halogen, expecially fluorine, chlorine or bromine, or aryl of from 6 to 10 carbon atoms, which may be substituted by halogen, alkyl, alkoxy, hydroxyl or trifluoromethyl.

5. Process as claimed in claim 1 wherein R³ is aryl of from 6 to 10 carbon atoms or aralkyl of from 1 to 3 carbon atoms in the alkyl moiety and 6 to 10 carbon atoms in the aryl moiety, which aryl or aralkyl radicals may be substituted on the aryl portion with a member of the group consisting of alkyl of from 1 to 4 carbon atoms, alkoxy of from 1 to 4 carbon atoms, alkylthio of from 1 to 4 carbon atoms, chlorine, fluorine, bromine dialkylamino of from 2 to 6 carbon atoms in each alkyl radical, cyano or thiocyano.

6. Process as claimed in claim 1 wherein R⁶ is chlorine or alkoxy of from 1 to 4 carbon atoms.

7. Process as claimed in claim 2 which comprises reacting 1-tert.-butyl-1-methoxycarbonyl-4-chloro-4-ethyl-2,3-diazabutadiene with hydrazine hydrate to give 3-ethyl-4-amino-6-tert.-butyl-1,2,4-triazin-5-one.

8. Process as claimed in claim 2 which comprises reacting 1-phenyl-1-ethoxy-carbonyl-4-chloro-4-ethyl-2,3-diazabutadiene with hydrazine hydrate to give 3-ethyl-4-amino-6-phenyl-1,2,4-triazin-5-one.

9. Process as claimed in claim 2 which comprises reacting 1-phenyl-1-ethoxy-carbonyl-4-chloro-4-cyclopropyl-2,3-diazabutadiene with hydrazine hydrate to give 3-cyclopropyl-4-amino-6-phenyl-1,2,4-triazin-5-one.

10. Process as claimed in claim 2 which comprises reacting 1-(4'-methoxyphenyl)-1-ethoxycarbonyl-4-chloro-4-methyl-2,3-diazabutadiene with hydrazine to give 3-methyl-4-amino-6-(4'-methoxy-phenyl)-1,2,4-triazin-5-one.

11. Process as claimed in claim 2 which comprises reacting 1-tert.-butyl-1-methoxycarbonyl-4-chloro-4-ethyl-2,3-diazabutadiene with methylamine to give 3-ethyl-4-methyl-6-tert.-butyl-1,2,4-triazin-5-one.

12. Process as claimed in claim 2 which comprises reacting 1-phenyl-1-ethoxy-carbonyl-4-chloro-4-ethyl-2,3-diazabutadiene with methylamine to give 3-ethyl-4-methyl-6-phenyl-1,2,4-triazin-5-one.

13. Process as claimed in claim 2 which comprises reacting 1-(4'-methylphenyl)-1-ethoxycarbonyl-4-chloro-4-ethyl-2,3-diazabutadiene with allylamine to give 3-ethyl-4-allyl-6-(4'-methylphenyl)-1,2,4-triazin-5-one.

14. Process as claimed in claim 2 which comprises reacting 1-phenyl-1-methoxy-carbonyl-4-chloro-4-ethyl-2,3-diazabutadiene with a mixture of hydroxylamine and triethylamine, to give 3-ethyl-4-hydroxy-6-phenyl-1,2,4-triazin-5-one.

15. 1,2,4-Triazine-5-one compound of the formula:

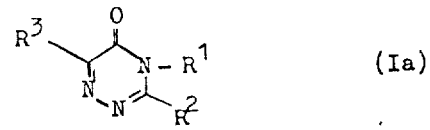

in which
R¹ is hydrogen, hydroxyl, straight-chain or branched alkyl with up to 6 carbon atoms, which may be substituted by hydroxyl or alkoxy of from 1 to 4 carbon atoms; straight-chain or branched alkenyl or alkynyl with in either case up to 6 carbon atoms, cycloalkyl with 3 to 6 carbon atoms; straight-chain or branched alkoxy with 1 to 4 carbon atoms; aralkyl of from 1 to 2 carbon atoms in the alkyl moiety and 6 to 10 carbon atoms in the aryl moiety, which aralkyl may be substituted by an alkyl, alkoxy or alkylthio radical of from 1 to 4 carbon atoms;
R² is hydrogen, straight-chain or branched alkyl of from 1 to 6 carbon atoms, which may be substituted by hydroxyl, cyano or an alkoxy or alkylthio group of from 1 to 4 carbon atoms; straight-chain or branched alkenyl of from 2 to 6 carbon atoms; straight-chain or branched alkenyl of from 2 to 6 carbon atoms, cycloalkyl of from 3 to 6 carbon atoms, aralkyl of from 1 to 2 carbon atoms in the alkyl moiety and 6 to 10 carbon atoms in the aryl moiety, which aralkyl may be substituted by hydroxyl, an alkyl, alkoxy or haloalkyl radical of from 1 to 4 carbon atoms or halogen, or aryl of from 6 to 10 carbon atoms, which may be substituted by halogen, alkyl, alkoxy, hydroxyl, or trifluoromethyl; and $R^3$ is unsubstituted straight-chain or branched alkyl of from 1 to 12 carbon atoms, alkyl of from 1 to 6 carbon atoms substituted by an alkoxy or alkylthio group of from 1 to 4 carbon atoms, by aryloxy of from 6 to 10 carbon atoms or by alkoxycarbonyl of from 1 to 3 carbonyl of from 1 to 3 carbon atoms in the alkyl moiety, straight-chain or branched alkenyl of from 2 to 12 carbon atoms, cycloalkyl of from 3 to 10 carbon atoms; aryl of from 6 to 10 carbon atoms or aralkyl of from 1 to 3 carbon atoms in the alkyl moiety and 6 to 10 carbon atoms in the aryl moiety wherein the two last-mentioned radicals $R^3$ may carry on the aryl radical one or more substituents selected from straight-chain or branched alkyl of from 1 to 4 carbon atoms, alkoxy of from 1 to 4 carbon atoms, alkylthio of from 1 to 4 carbon atoms, halogen, dialkylamino of from 2 to 6 carbon atoms in each alkyl radical, cyano or thiocyano.

* * * * *